United States Patent
Branson et al.

(10) Patent No.: US 9,619,518 B2
(45) Date of Patent: *Apr. 11, 2017

(54) TRACKING TUPLES TO REDUCE REDUNDANCY IN A GRAPH

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/086,580

(22) Filed: Mar. 31, 2016

(65) Prior Publication Data

US 2016/0364450 A1 Dec. 15, 2016

Related U.S. Application Data

(63) Continuation of application No. 14/737,583, filed on Jun. 12, 2015.

(51) Int. Cl.
*G06F 17/30* (2006.01)
*G06F 7/00* (2006.01)

(52) U.S. Cl.
CPC .. *G06F 17/30489* (2013.01); *G06F 17/30303* (2013.01); *G06F 17/30371* (2013.01); *G06F 17/30516* (2013.01); *G06F 17/30958* (2013.01)

(58) Field of Classification Search
CPC ............. G06F 17/30516; G06F 17/30489
See application file for complete search history.

(56) References Cited

U.S. PATENT DOCUMENTS

| | | | |
|---|---|---|---|
| 8,600,976 B2 | 12/2013 | Cradick et al. | |
| 2013/0054779 A1* | 2/2013 | Cradick | G06F 15/173 709/224 |
| 2013/0290489 A1* | 10/2013 | Branson | H04L 47/25 709/219 |
| 2014/0089351 A1 | 3/2014 | Branson et al. | |
| 2014/0089352 A1* | 3/2014 | Branson | G06F 17/30958 707/798 |
| 2014/0095529 A1 | 4/2014 | Deshmukh et al. | |

OTHER PUBLICATIONS

Kang et al., "Evaluating Window Joins over Unbounded Streams," 19th International Conference on Data Engineering, Mar. 5-8, 2003, pp. 1-12. DOI: 10.1109/ICDE.2003.1260804.

(Continued)

*Primary Examiner* — Marc Somers
(74) *Attorney, Agent, or Firm* — Laura E. Gisler

(57) ABSTRACT

A stream of tuples can assigned identifiers to tuples to store only the nonduplicative tuples. In a streams processing environment, a stream application actor like an operator can receive a series of tuples, process them, and output another series of tuples. Each of the tuples can be assigned a tuple identifier. The tuple identifier can tag the tuple as associated with the operator. Another operator can receive the tuples, identify the duplicative tuples, and store only the nonduplicative tuples.

1 Claim, 8 Drawing Sheets

(56) References Cited

OTHER PUBLICATIONS

Turaga et al., "Design principles for developing stream processing applications," Journal Software—Practice & Experience—Focus on Selected PhD Literature Reviews in the Practical Aspects of Software Technology, vol. 40, Issue 12, Nov. 2010, pp. 1073-1104, Copyright 2010 John Wiley & Sons, Ltd. DOI: 10.1002/spe.v40:12.
Branson et al., "Tracking Tuplesto Reduce Redundacy in a graph"U.S. Appl. No. 14/737,583, filed Jun. 12, 2015.
List of IBM Patents or Patent Applications Treated as Related, dated Mar. 31, 2016, pp: 1-2.
Li et al., "Semantics and Evaluation Techniques for Window Aggregates in Data Streams," Proceedings of the 2005 ACM SIGMOD International Conference on Management of Data, Jun. 14-16, 2005, pp. 311-322, Copyright 2005 ACM. DOI: 10.1145/1066157.1066193.

\* cited by examiner

TRACKING TUPLES TO REDUCE REDUNDANCY IN A GRAPH

BACKGROUND

The present disclosure relates generally to the field of stream computing, and more particularly to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

Embodiments of the present disclosure may be directed toward a computer implemented method for processing a stream of tuples, when the stream of tuples are to be processed by a plurality of processing elements operating on one or more computer processors. Each processing element may have one or more streams operators, which can include code configured to output tuples to other stream operators. A first series of tuples may be received from a first stream application actor. The first stream application actor may be configured to perform one or more operations on the first series of tuples. The application actor may output a second series of tuples. Each tuple in the second series may be assigned a tuple identifier. The tuple identifier may associate the first stream application actor to each tuple in the second series. A second stream application actor may receive the second series of tuples. The second application actor may comprise a windowing operator that has a window memory. A set of duplicative tuples in the second series may be identified based on the assigned tuple identifiers and a set of parameters. The set of duplicative tuples may comprise one or more tuples that are duplicative in view of tuples outside the set of duplicative tuples and in the second series of tuples. A set of nonduplicative tuples can then be stored in the window memory of the second stream application actor. The set of nonduplicative tuples can be the tuples remaining in the second series of tuples after the set of duplicate tuples have been removed.

Embodiments of the present disclosure may be directed toward a computer system for processing a stream of tuples. The stream of tuples may be processed by a plurality of processing elements operating on one or more computer processors. Each processing element may have one or more streams operators, which can include code configured to output tuples to other stream operators. The computer system may have at least one processor circuit that can receive a first series of tuples from a first stream application actor. The first stream application actor may be configured to perform operations on the first series of tuples. The application actor may output a second series of tuples. Each tuple in the second series may be assigned a tuple identifier. The tuple identifier may associate the first stream application actor to each tuple in the second series.

A second stream application actor may receive the second series of tuples. The second application actor may comprise a windowing operator that has a window memory. A set of duplicative tuples in the second series may be identified based on the assigned tuple identifiers and a set of parameters. The set of duplicative tuples may comprise one or more tuples that are duplicative in view of tuples outside the set of duplicative tuples and in the second series of tuples. A set of nonduplicative tuples can then be stored in the window memory of the second stream application actor. The set of nonduplicative tuples can be the tuples remaining in the second series of tuples after the set of duplicate tuples have been removed.

Embodiments of the present disclosure may be directed toward a computer program product for processing a stream of tuples. The stream of tuples may be processed by processing elements operating on computer processors. Each processing element may have streams operators. The streams operators an include code configured to output tuples to other stream operators. The computer program product may comprise a compute readable storage medium with program instruction, and the computer readable storage medium is not a transitory signal per se. The program instructions may be executable by a computer processing circuit to cause the circuit to perform the following steps. A first series of tuples may be received from a first stream application actor. The first stream application actor may be configured to perform one or more operations on the first series of tuples. The application actor may output a second series of tuples. Each tuple in the second series may be assigned a tuple identifier. The tuple identifier may associate the first stream application actor to each tuple in the second series. A second stream application actor may receive the second series of tuples. The second application actor may comprise a windowing operator that has a window memory. A set of duplicative tuples in the second series may be identified based on the assigned tuple identifiers and a set of parameters. The set of duplicative tuples may comprise one or more tuples that are duplicative in view of tuples outside the set of duplicative tuples and in the second series of tuples. A set of nonduplicative tuples can then be stored in the window memory of the second stream application actor. The set of nonduplicative tuples can be the tuples remaining in the second series of tuples after the set of duplicate tuples have been removed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
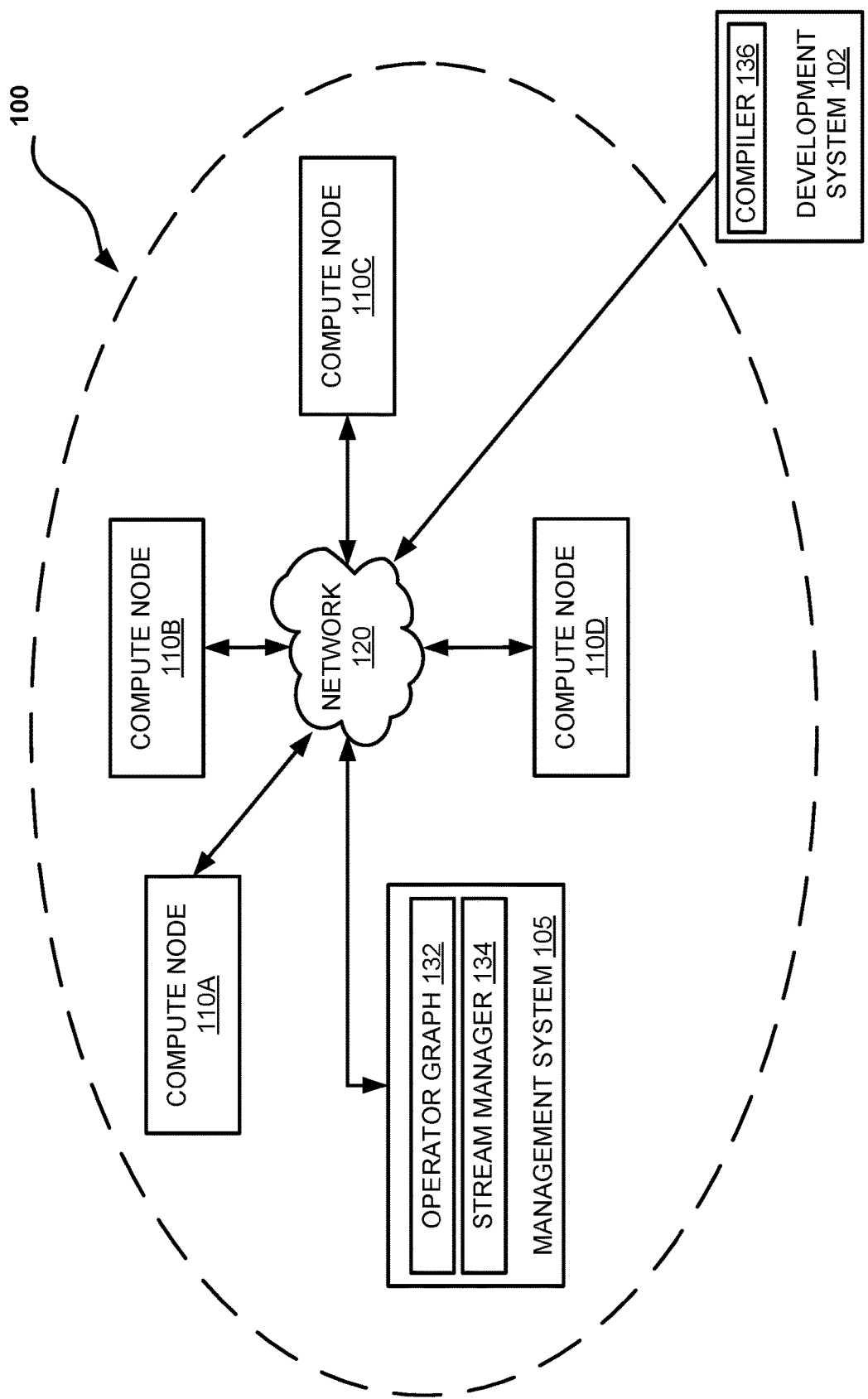
FIG. 1 illustrates a computing infrastructure configured to execute a stream computing application, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to stream computing, and in particular, to computing applications that receive streaming data and process the data as it is received. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average.

An operator graph may be a linear arrangement of stream application actors. Stream application actors may include for example, processing elements, operators, and others. The operator graph may include one or more distinct execution paths, also known as sub-processes, methods, or branches.

A stream computing application may have several "jobs" (i.e., specific applications) executing in parallel. Each job may be associated with an individual data flow. These individual data flows may be thought of as separate operator graphs or portions of the same logical operator graph. In either case, a job or administrator may specify a particular stream of data (e.g., a connection between processing elements or operators in the operator graph) as "exportable." A different job may then dynamically connect to the exportable data stream (i.e., import the data stream). In embodiments, this is referred to as a "dynamic connection" because both jobs are currently executing when they begin to share the data stream.

A first stream operator may be configured to receive a first series of tuples. This series could be a group of one or more tuples that have been grouped in a series. The first stream operator may be configured to receive a first tuple in the series, perform an operation on the first tuple, and output a second tuple. The second tuple may be a part of a second series of tuples. The second tuple may be considered a "spawn" of the first tuple, and the first tuple may be considered a "progenitor" of the second tuple. A tuple may have multiple generations of spawns and/or progenitors. For example, the second tuple may be specifically referred to as a "first-generation" spawn of the first tuple because it was generated as a result of a stream operator performing operations directly on the first tuple. If a second stream operator received the second tuple, performed an operation on the second tuple, and output a third tuple, the third tuple would be a spawn of both the first and the second tuples. More specifically, the third tuple would be a first-generation spawn of the second tuple, and a "second-generation" spawn of the first tuple. If the first stream operator passes the first tuple on to the second stream operator, instead of passing on spawns (e.g., the tuple is unmodified), and the second stream operator created one or more tuples from the first tuple (e.g., spawn tuples), the one or more tuples would be still be considered first-generation spawns of the first tuple. As an operator graph grows in complexity, additional generations of spawn and progenitor tuples may be present.

In embodiments, each of the tuples in the operator graph may be assigned a tuple ID. This tuple ID can serve as an identifier of the particular tuple as it moves throughout the operator graph. The tuple ID may reflect the source of the tuple and the tuple's genealogy (e.g., the particular tuple's progenitor tuple and the generation or generations related to each progenitor tuple). The tuple ID may also reflect the one or more stream application actors that are associated with the tuple. For example, a tuple ID may reflect a set of one or more stream operators that have processed the particular tuple and/or the tuple's progenitor tuple. For example, the tuple ID may reflect the processing element comprised by a stream operator that processed the particular tuple. For example, a tuple ID may reflect both a processing element and a stream operator identification.

In embodiments, the tuple ID can comprise one or more pieces of identifying data or "tags". These tags can contain data from a stream application actor such as an operator or a processing element. The tags can also be data from a tuple or a progenitor tuple, associating the tuple with its spawn.

A stream operator may perform an operation that employs a windowing condition. A "window," as referred to in this description and the claims, is a logical container for tuples received by an input port of a stream operator. Conceptually, a stream may be considered a pseudo-infinite sequence of tuples. A windowing condition may allow for the creation of subsets or groups of tuples within a stream, allowing a stream operator to perform an operation on a group of tuples instead of a single tuple. As an example, an aggregate stream operator supports windowing by default. However, a stream operator may not necessarily support windowing by default. A stream operator may, however, be configured to support windowing.

In embodiments, the tuple IDs can be used to decrease demands on a stream operator's window memory. A system administrator can set parameters that define a level at which tuples are considered duplicative of one another. For example, spawn tuples from a same stream operator could be considered duplicative. In some embodiments, tuples from a same processing element could be considered duplicative. Other parameters could be set by the system administrator to define duplicative and nonduplicative tuples in an operator graph. The parameters may be set in other ways, as described herein.

In some embodiments, the set of duplicative tuples may comprise one or more tuples that are duplicative in view of the tuples outside the set of duplicative tuples and a series of tuples. For example, a series of tuples may include tuples with tuple IDs T1, T2$a$, T2$b$, and T3. Tuple T2$b$ may be considered duplicative, in view of presence of tuple T2$a$ in the series of tuples. Thus, the set of duplicative tuples would contain only tuple T2$b$. Tuple T2$b$ could then be dropped from the graph, and only tuples T1, T2$a$, and T3 may be stored in the windowing memory. In another example, a series of tuples may include tuples bearing the tuple IDs T4, T5, T6, T7$a$, T7$b$, T7$c$, T7$d$, and T8. Tuples T7$a$, T7$b$, and T7$c$ may comprise the set of duplicative tuples, as tuples T7$a$-$c$ may be considered duplicative in view of the inclusion of tuple T7$d$ in the series of tuples.

In embodiments, a set of tuples may arrive at a particular stream operator. One or more tuples in that set of tuples may be identified as duplicative. Before being stored in the window, duplicative tuples may be dropped (e.g., from the operator graph and not stored). In some cases, this may occur prior to processing. In some cases, the duplicative tuples may be dropped after they are processed but prior to storage in the window. The remaining tuples in the set (i.e., nonduplicative tuples) can then be stored in the window of the stream operator.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
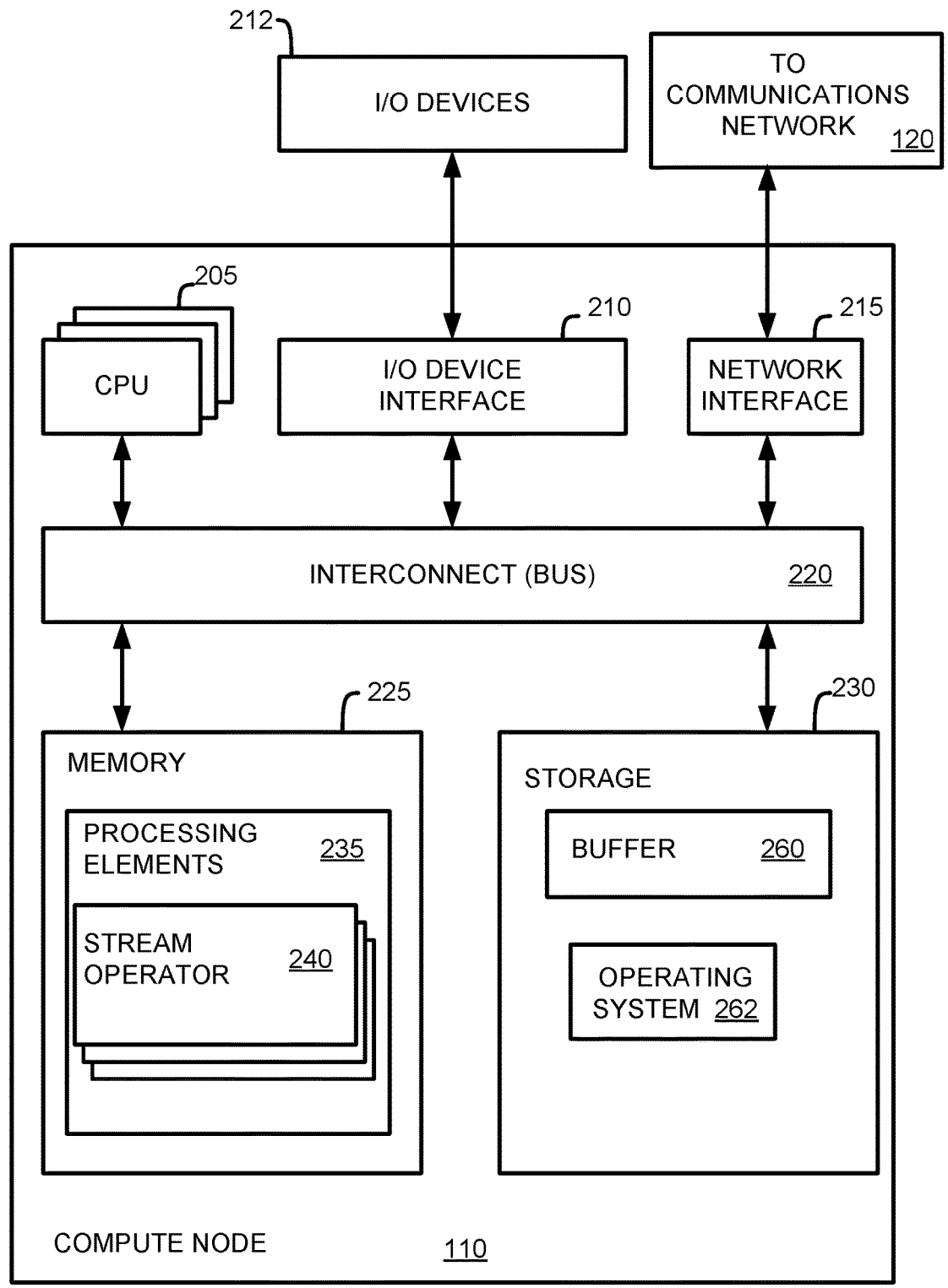
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
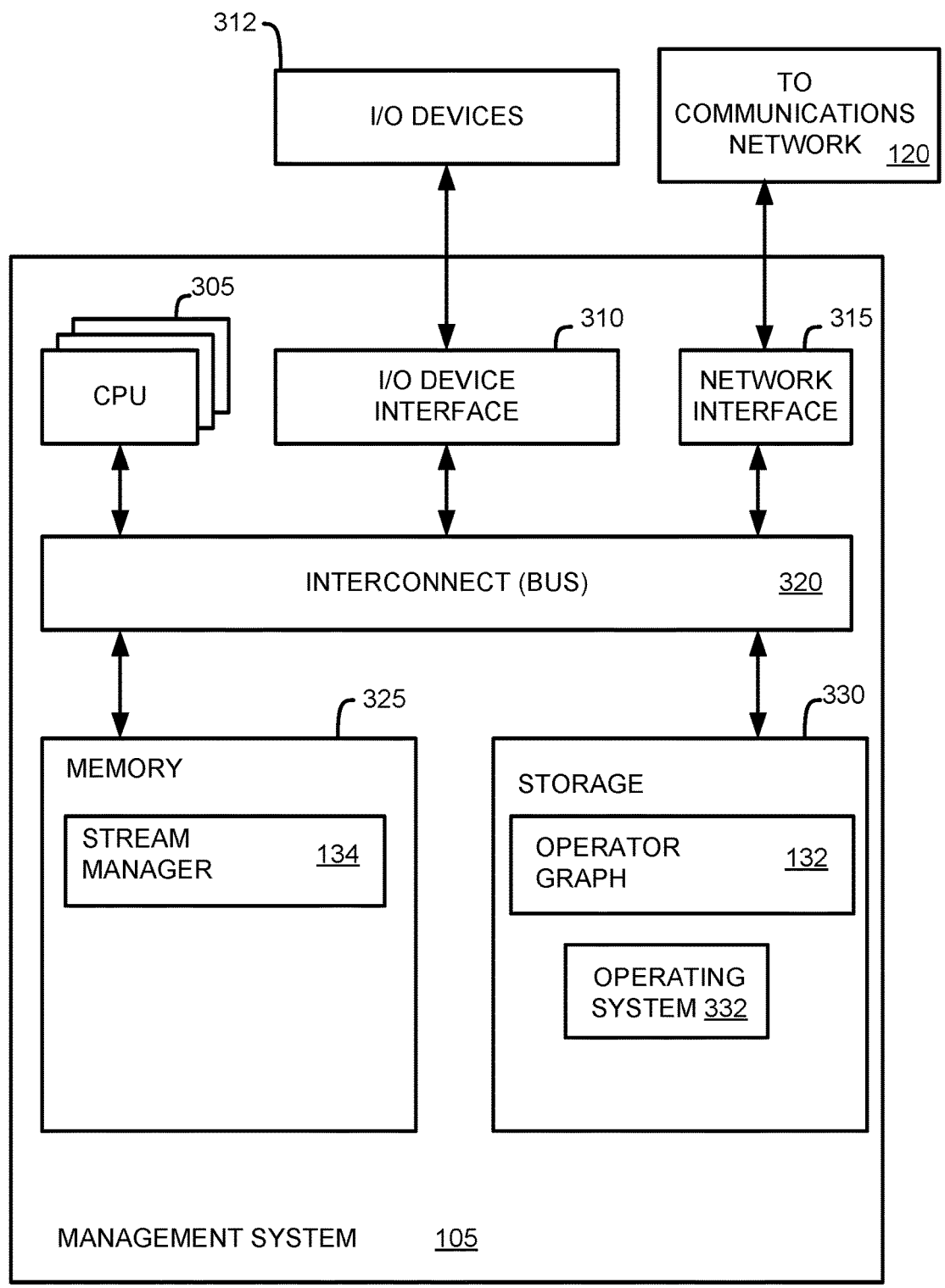
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
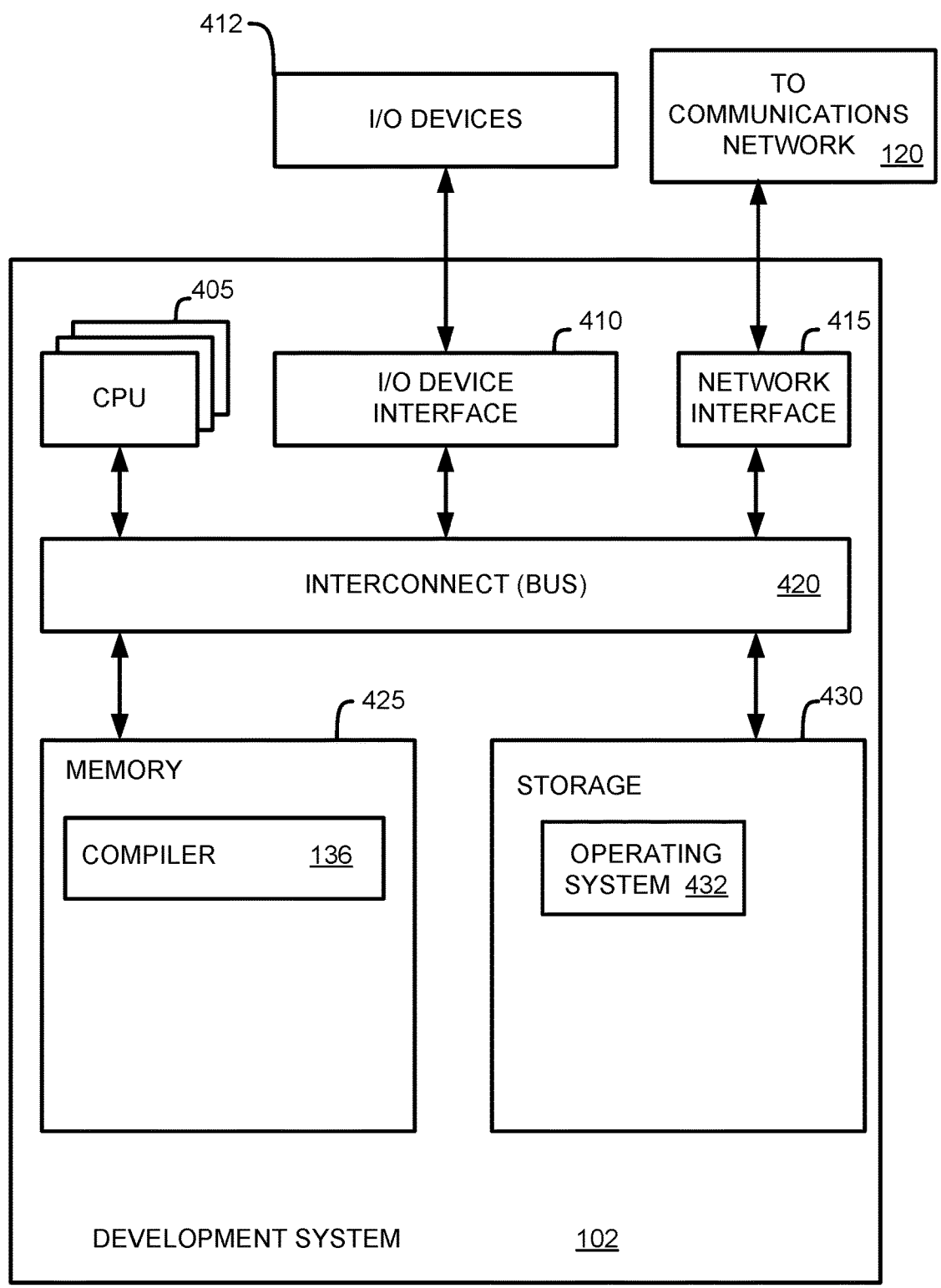
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
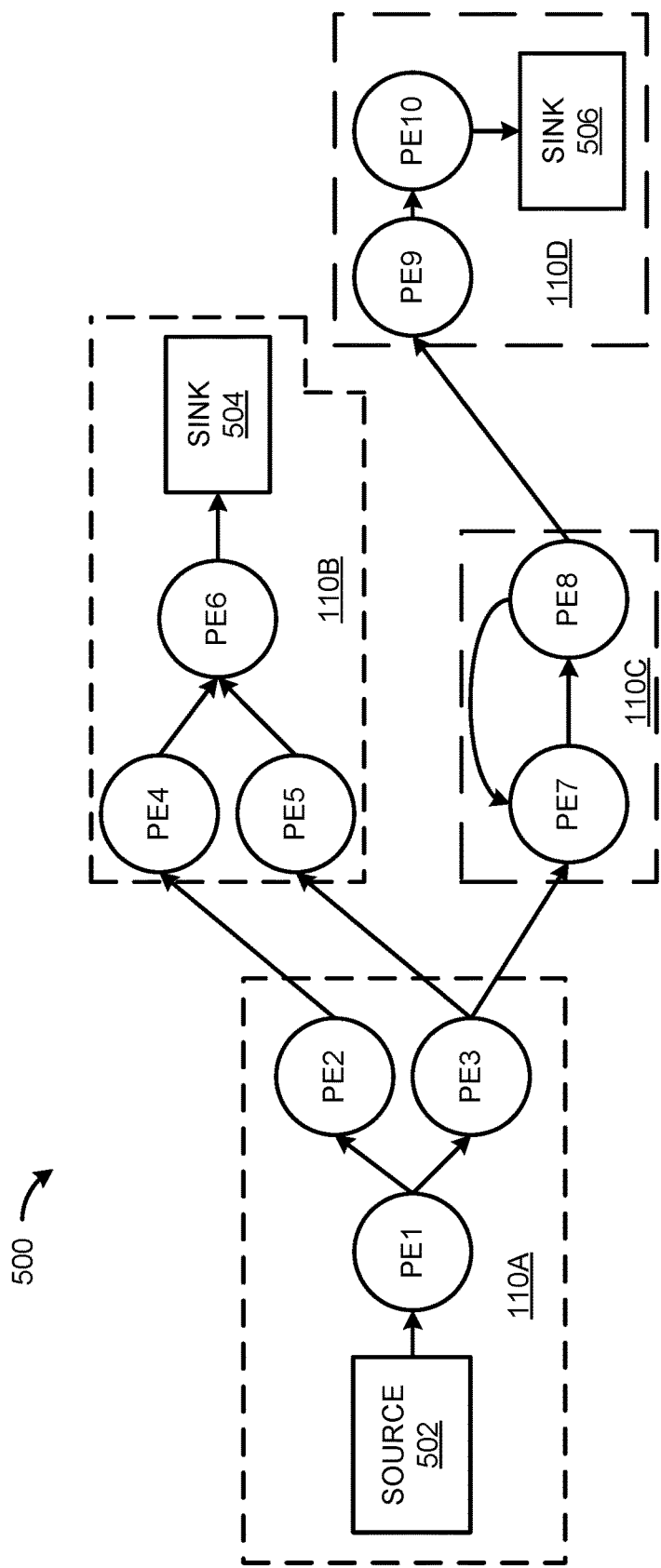
FIG. 5 illustrates an operator graph for a stream computing application, according to various embodiments.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 before being transmitted to a sink 504. Similarly, tuples flowing from PE3 to PE5 also reach PE6 and are sent to a sink 504. Thus, PE6 could be configured to perform a join operation, combining tuples received from PE4 and PE5, before sending the data to the sink 504. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in PE10 before being sent to a sink 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
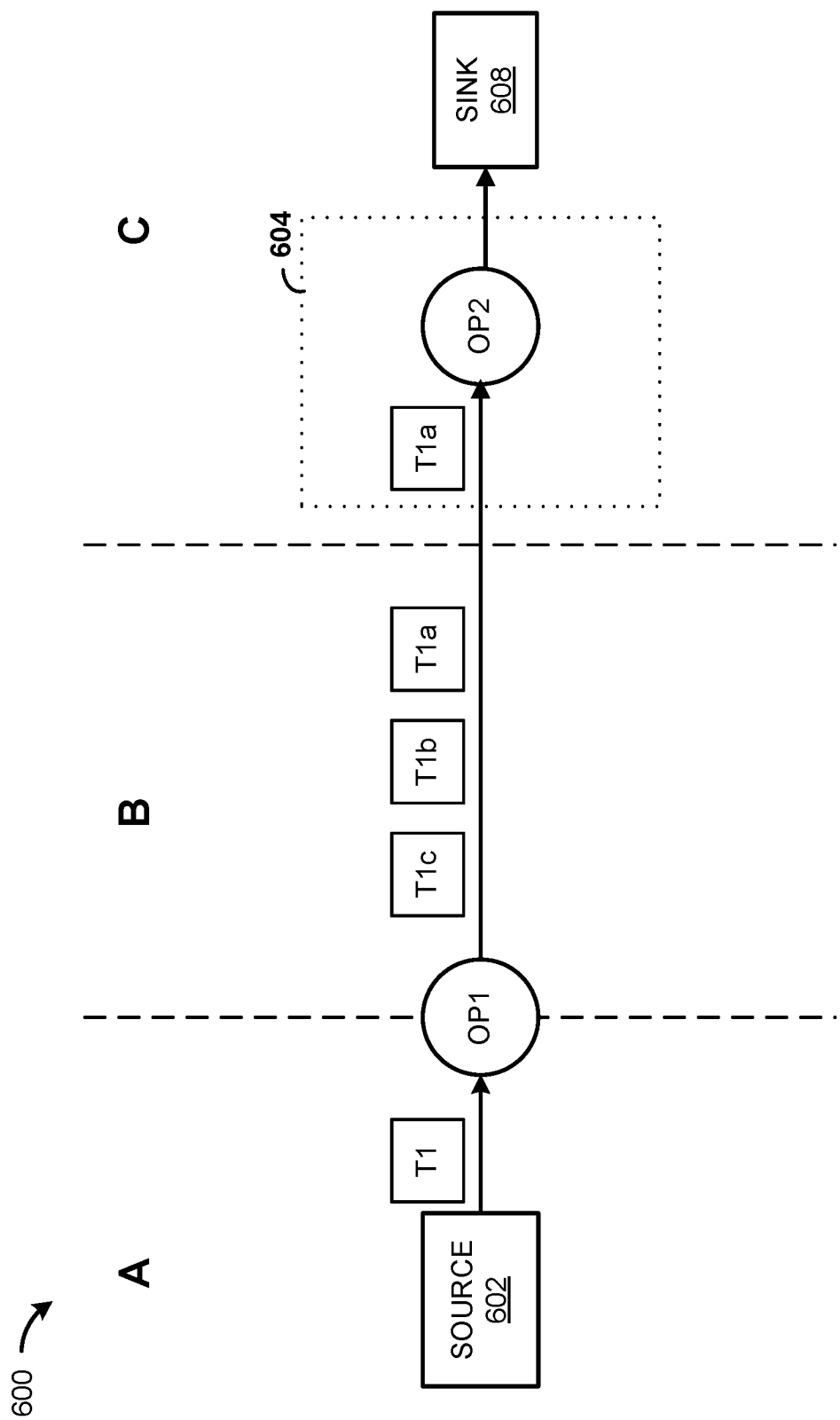
FIG. 6 illustrates an example of an operator graph of a stream computing application in which illustrative embodiments of the present disclosure may be implemented.

Referring now to FIG. 6, shown is an example of an operator graph 600 of a stream computing application in which illustrative embodiments of the present disclosure may be implemented. The operator graph 600 consists of three phases: A, B, and C. Phase A depicts a source 602 and a tuple T1 prior to its processing by an operator OP1. Phase B depicts OP1 and three tuples T1a-T1c output by Op1. Phase C depicts one of the tuples output by OP1, received by OP2 and stored in the windowing memory 604 of Op2. Phase C also depicts a final destination of the tuples, Sink 608. The first tuple T1 is a tuple generated by a source 602 and sent to the first stream operator OP1. Tuples T1a-T1c are tuples that are generated by the stream operator OP1 as a result of the first tuple T1 entering the operator graph 600.

For example, at phase A after the first tuple T1 enters the first stream operator OP1, the first stream operator may perform one or more operations on the first tuple. After the first stream operator OP1 performs the one or more operations on the first tuple, the first stream operator may generate tuples T1a-T1c.

At phase B, the stream operator OP1 may output three tuples T1a, T1b, and T1c. Each of these tuples may be assigned a tuple identifier (e.g., T1, T1a, T1b, T1c). This tuple identifier may contain identifying information that associates the tuple with the stream operator which processed it. For example, part of the tuple identifier for tuple T1a could be an identifier of the first operator (e.g., "1"). In this way, another stream application actor (e.g., another stream operator or a processing element) could identify the spawn tuples of OP1 (e.g., T1a-c) as duplicative. This could also be applied to other stream application actors such as a processing elements, as described in more detail at FIG. 7.

At phase C, the tuples T1a-T1c can then be received by a next stream application actor, here an operator OP2, to be processed. Before they are processed however, the tuples may be identified as duplicative. This identification can be based on the tuple identifier and one or more parameters. For example, a parameter could be defined which equates as duplicative any tuple output by a particular operator (e.g., tuples T1a-c are duplicates of each other, and thus T1b and T1c are duplicative). A parameter could also be defined which equates as duplicative any tuple output by a particular processing element. The nonduplicative tuples could then be stored in the operator memory window 604 for processing.

In some embodiments, duplicative tuples could be identified, and all received tuples (i.e., including duplicative tuples) could be processed. The nonduplicative tuples could then (i.e., post processing) be stored in the window memory 604 of the stream operator. After processing, the tuples could then be stored in a sink 608, as described herein.

Figure 7:
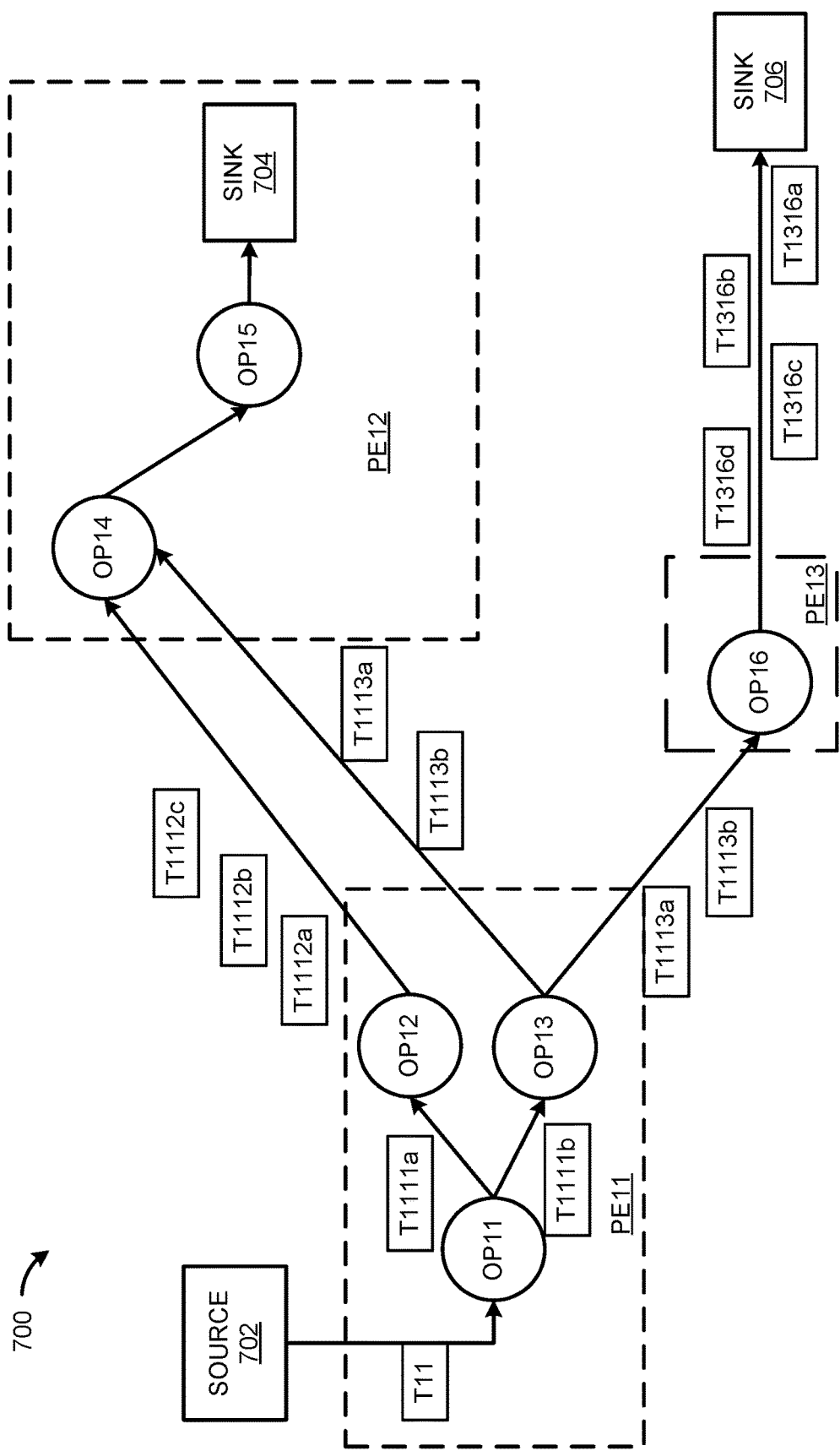
FIG. 7 illustrates an example of an operator graph of a stream computing application for tracking tuples to reduce redundancy in the graph in which illustrative embodiments of the present disclosure may be implemented.

FIG. 7 depicts an example of an operator graph 700 of a stream computing application for tracking tuples to reduce redundancy in the graph in which illustrative embodiments of the present disclosure may be implemented. As depicted, operator graph 700 may have a source 702, from which the tuples of data originate and may flow from the source 702 to one or more sinks 704 and 706. The tuples (e.g., T11) may flow from the source 702 through processing element PE11 to be processed first by stream operator OP11, then either by stream operator OP12 (e.g., tuple T1111a) or stream operator OP13 (e.g., tuple T1111b). From there, the tuples from OP12 (e.g., T1112a-c) can be processed by the stream operators in processing element PE12, first by OP14 then by OP15. Finally, they can be received by the sink 704. The tuples flowing from OP13, here T113a and T113b can be processed by the operator in processing element PE13, OP16. The tuples processed and output by OP16 (e.g., T1316a-d) can then flow to sink 706. OP13 can also process tuples and output them to OP14 in PE12. These tuples T1113a and T1113b can have a tuple ID that associates them to PE11 and OP13.

Each tuple in the operator graph 700 may have a tuple ID, which is a unique identifier for that tuple. Tuple IDs may be assigned to a tuple when the tuple is generated by a stream operator or at another time. For example, the source 702 may assign a tuple ID to the first tuple T11, and the first stream operator OP11 may assign a tuple ID to the second tuple T1111a. The tuple IDs may be used by the stream application actors including a stream manager, the stream operators, and/or processing elements to monitor the creation of spawn tuples and identify the tuples as spawn tuples throughout the operator graph.

The tuple IDs used throughout the graph may indicate a relationship between the tuples, for example, siblings. The tuple IDs can also indicate a relationship to a particular processing element and/or stream operator. For example, tuple ID T1111a identifies that tuple as one that was output by OP11 and created in or by PE11. For example, the tuple ID T1316d indicates that the tuple was output by OP16 and in PE13. In this way, tuples T1316a-d can each be identified as siblings, or spawns of predeceasing tuple processed by OP16 at PE13.

For example, tuples with tuple IDs T1112a-c can flow to OP14. At the same time tuples T1113a and T1113b can also flow to OP14. OP14 may be configured to identify all tuples flowing from the same stream operator to be duplicative. Thus, OP14 could identify T1112b and T1112c as duplicative tuples of T1112a, and drop (i.e., not store) the duplicative tuples T1112b and T1112c from OP14's window memory.

In another example, OP14 may be configured to identify as duplicative all tuples originating from the same processing element. In this case, OP14 could identify T1112a, T1112b, T1112c, T1113a, and T1113b as siblings, and thus duplicates of one another. Thus, if T1113a was received by OP14 first, the remaining, duplicative tuples (T1112a, T1112b, T1112c, and T1113b) could each be dropped from the graph and only T13a would be stored and processed. In embodiments, all tuples (T1112a-c and T1113a-b) could be processed, but only the nonduplicative (e.g., one tuples of the set T1112a-c and T1113a-b) could be stored in the OP14 windowing memory.

In embodiments, each stream operator and/or each processing element could be configured individually to identify the level of abstraction desired for a determination of whether or not tuples are duplicative. For example, in graph 700, all the stream operators of PE11 (OP11, OP12, and OP13) could be configured to identify as duplicative tuples spawn tuples of a particular tuple processed by the same tuple. At the same time, OP14 of PE12 could be configured to identify as duplicative all spawn tuples processed by the same processing element (as indicated by a portion of each tuples tuple ID). OP15, however, could be configured to identify a finer grained distinction, namely only those tuples that are spawns of a tuple and processed by the same operator are considered duplicative. In this way, a graph can be customized to decrease resource consumption as well as to decrease latency caused by duplicative tuple processing at various levels of specificity.

Figure 8:
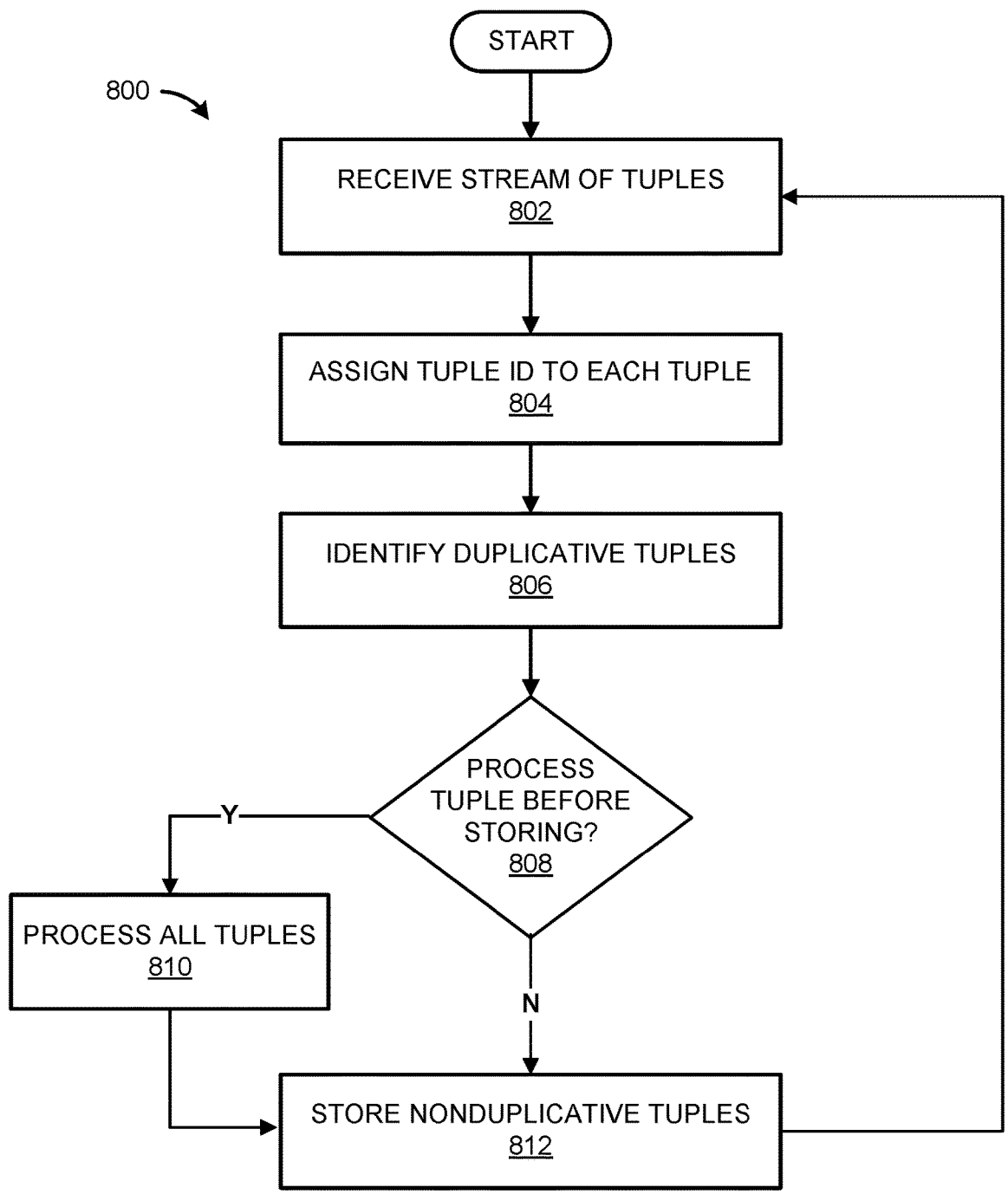
FIG. 8 illustrates a flowchart of a method for identifying and storing nonduplicative tuples, in accordance with embodiments of the present disclosure.

FIG. 8 illustrates a flowchart 800 of a method for identifying and storing nonduplicative tuples, in accordance with embodiments of the present disclosure. In embodiments, the method 800 may be performed by a stream manager 134 (shown in FIG. 1). In embodiments, the method 800 may be performed by a stream operator. The method 800 may begin at operation 802, where a stream of tuples may be received. At 804, a tuple ID can be assigned to each tuple.

In embodiments, the tuple ID assigned in operation 804 may apply to all stream application actors (e.g., stream operators and processing elements) in the entire operator graph. In some embodiments, the tuple ID assigned in operation 804 may only apply to a set of steam application actors (e.g., one or more stream operators). Other groups of stream application actors in the same operator graph may assign different tuple IDs, while some groups of stream application actors may not assign tuple IDs.

There may be scenarios where it is ambiguous as to what tuple ID should be assigned to a spawn tuple. For example, a multi-ported operator may receive three tuples, one from each of three different data streams, sum the tuples, and transmit a spawn tuple. In these cases, the assignment of a tuple ID may be configured by a user or administrator to assign an ID to the spawn tuple that incorporates identifying information from all, some, or one of the input tuples. For example, in some embodiments the administrator may establish that the spawn tuple should be assigned an ID based on whichever tuple entered a specific port. In some embodiments, the administrator may assign an ID based on the order of entry into the operator, regardless of the port used.

The assignment of tuple IDs can take into account the processes executed by the one or more operators, parameters on which the identification of duplicative tuples is based, and/or other factors that may impact the dropping of any duplicative tuples from the graph.

At operation 806, duplicative tuples may be identified based on the tuple IDs. As described herein, the tuples may be identified as duplicates based on their association as spawns of the same tuple on a stream operator level, a processing element level, or on another level as determined by a system administrator, or determined in another way. Non duplicate tuples may be those tuples that are not duplicates, as identified based on tuple ID.

If the stream operator is to process the tuples before storing, at 808, then all tuples can be processed, per operation 810. The duplicative tuples, as identified in operation 806, can then be dropped (e.g., deleted) from the operator graph, in order that only the nonduplicative tuples in the set may be stored, per 812. If however, the tuples are stored first and processed later at operation 808, the operator can store only the nonduplicative tuples, per 812. The nonduplicative tuples can be those identified at operation 806. Once the nonduplicative tuples have been stored, and thus the duplicate tuples have been dropped from the operator graph, the stream application actor that is executing method 800 can receive additional tuples, per 802, and move through the operations detailed in the flowchart again.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for processing a stream of tuples, wherein the stream of tuples are to be processed by a plurality of processing elements operating on one or more computer processors, each processing element having one or more stream operators, wherein one or more of the stream operators include code configured to output tuples to one or more other stream operators, and wherein the plurality of processing elements are arranged in a linear execution path in an operator graph, the method comprising:

receiving a first series of tuples at a first processing element, the first processing element configured to perform one or more operations on the first series of tuples and to output a second series of tuples, wherein the one or more operations include analysis logic;

assigning, to each tuple in the second series of tuples, a tuple identifier, the tuple identifier associating the first processing element to each tuple in the second series of tuples and wherein the tuple identifier comprises identification information from the first processing element and identification information relating each tuple in the second series of tuples to one or more of its sibling tuples;

receiving, by a second processing element, the second series of tuples, the second processing element comprising a windowing operator, the windowing operator having a window memory, and wherein the first and second processing elements run on the same memory and are located on the same compute node;

identifying, based on the assigned tuple identifiers and a set of parameters, a set of duplicative tuples in the second series of tuples; the set of duplicative tuples comprising one or more tuples that are duplicative in view of tuples outside the set of duplicative tuples and in the second series of tuples, and wherein the set of duplicative tuples are identified using the set of parameters, wherein the set of parameters define sibling tuples as duplicative;

processing, in response to the identifying and by the second processing element, the second series of tuples, wherein the processing comprises adding metadata to each tuple in the second series of tuples, wherein the metadata associates each tuple with the processing and its sibling tuples; and storing, in the window memory of the second processing element, a set of nonduplicative tuples for later processing, the window memory of the second processing element configured to store tuples, the set of nonduplicative tuples comprising tuples remaining in the second series of tuples after a removal of the set of duplicative tuples therefrom.

* * * * *